Figure 1:
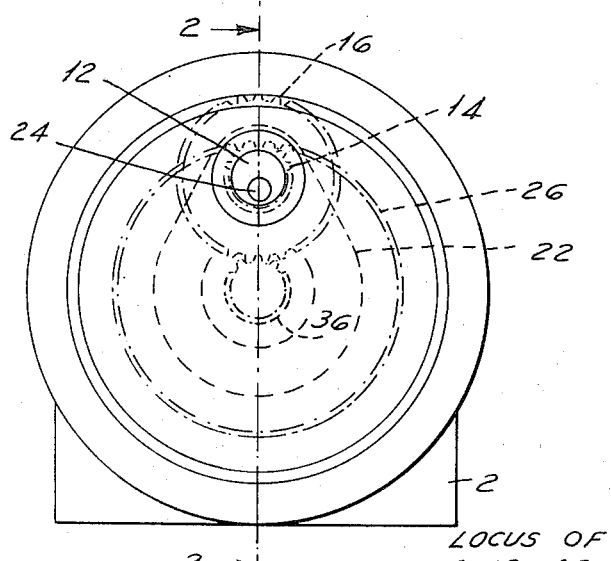

United States Patent [19]

Brems

[11] 3,857,479

[45] Dec. 31, 1974

[54] PRIME MOVER MECHANISM AND TRANSFER SYSTEM

[76] Inventor: John Henry Brems, 32867 White Oaks Tr., Birmingham, Mich.

[22] Filed: June 26, 1972

[21] Appl. No.: 266,335

[52] U.S. Cl. .................................. 198/219, 74/86
[51] Int. Cl. ............................................ B65g 25/04
[58] Field of Search .......... 74/52, 86; 198/218, 219

[56] References Cited
UNITED STATES PATENTS
3,324,992  6/1967  Morgan.............................. 198/219
3,703,103  11/1972  Davies ................................. 74/86

Primary Examiner—Evon C. Blunk
Assistant Examiner—Douglas D. Watts
Attorney, Agent, or Firm—Barnes, Kisselle, Raisch & Choate

[57] ABSTRACT

A mechanical drive system for a transfer system using a lift-and-carry stroke wherein workpieces can be lifted, translated to a new work station and lowered to a work position, including a power system with a rotary input and an output which is quadratic in following a continuous path having two parallel strokes in opposite directions and two parallel strokes normal to the other strokes and an interconnection which results in the motion of the transfer bar means normal to the transfer path for the lifting and lowering cycles and in the direction of the transfer path for the translational cycle and return stroke.

9 Claims, 33 Drawing Figures

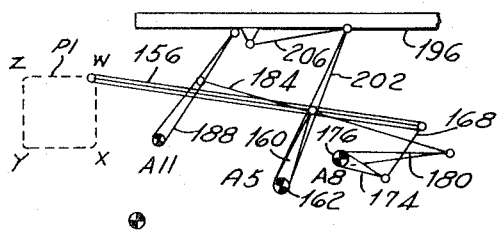
FIG.12
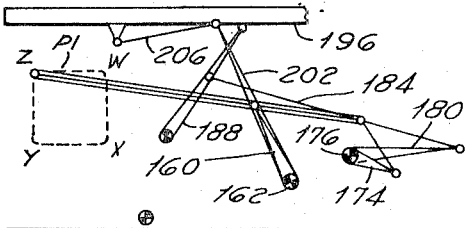
FIG.15
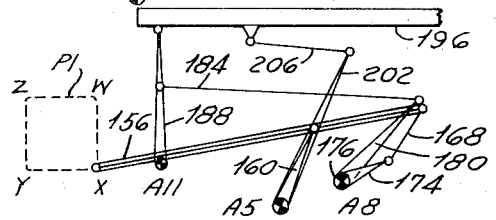
FIG.13
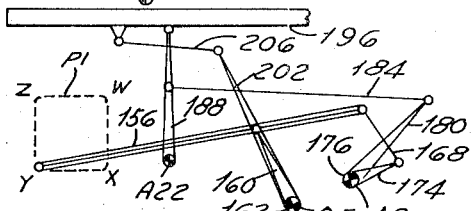
FIG.14
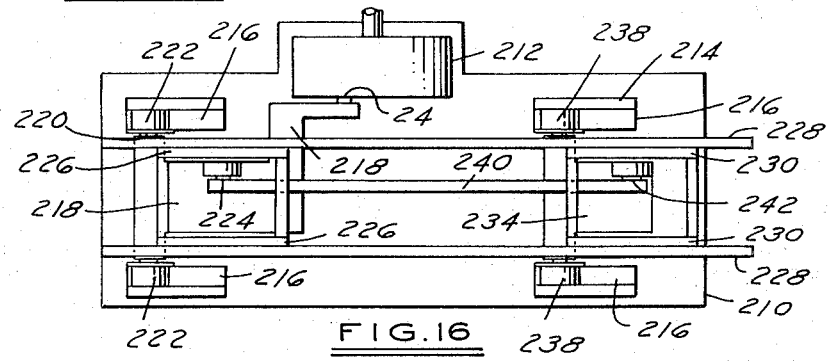
FIG.16
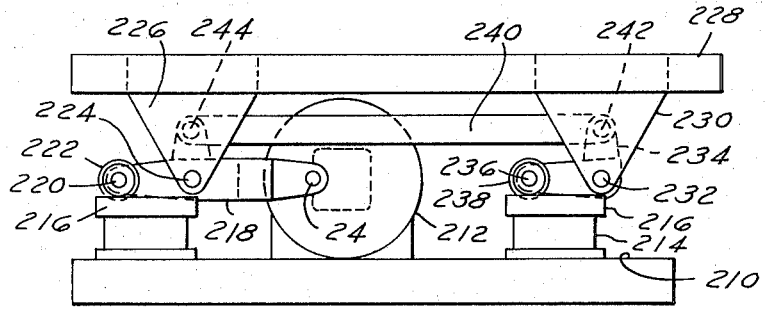
FIG.17
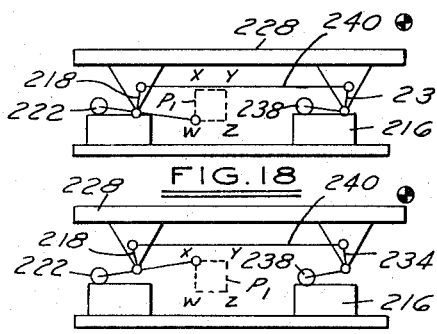
FIG.18
FIG.19
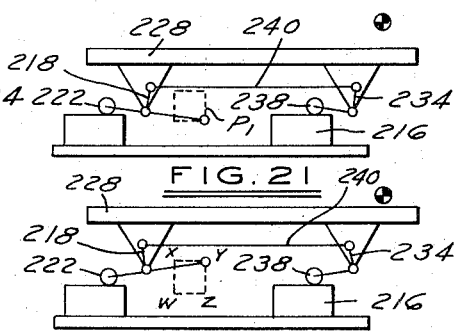
FIG.21
FIG.20

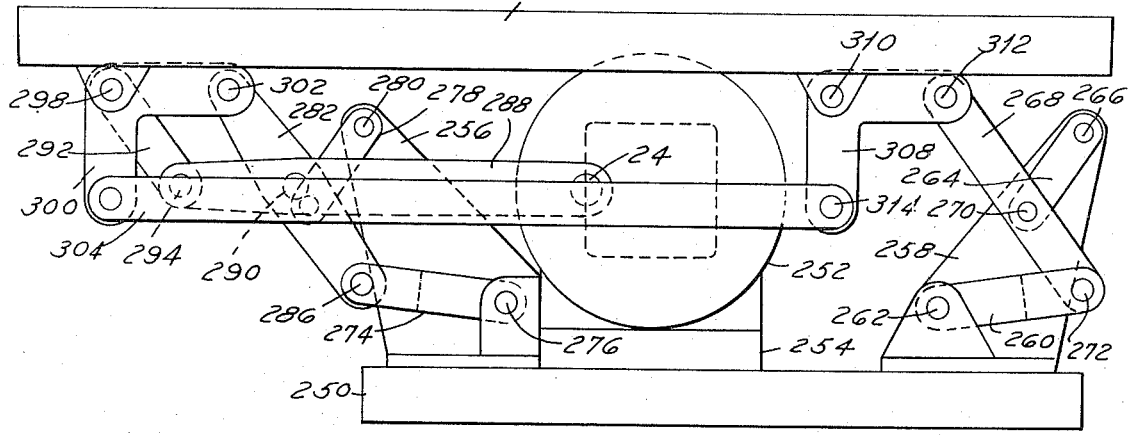
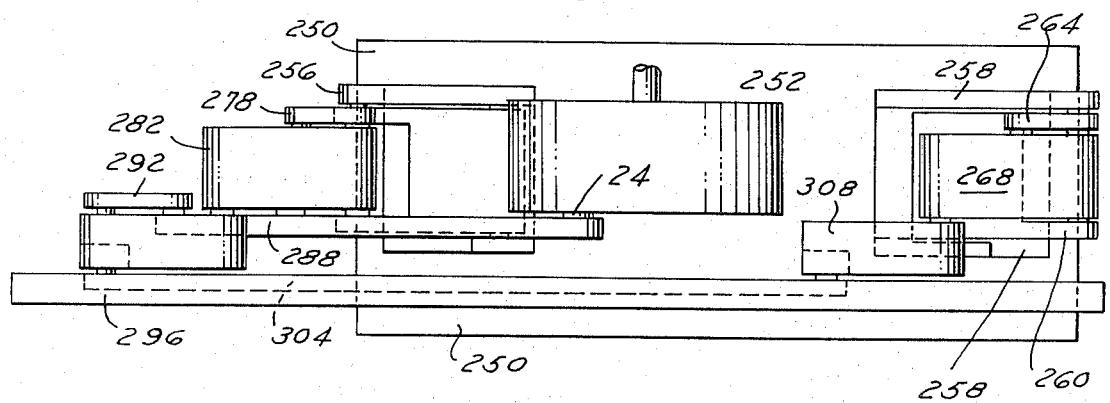
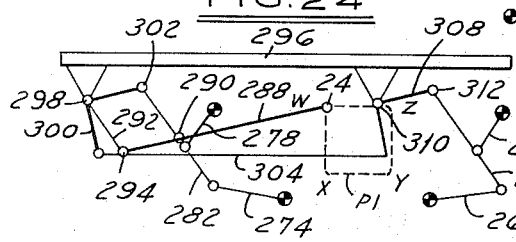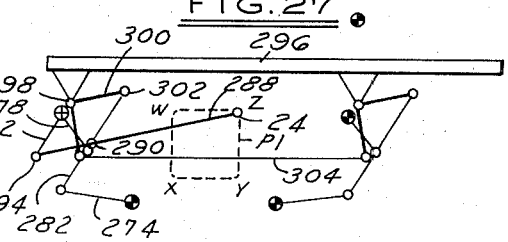
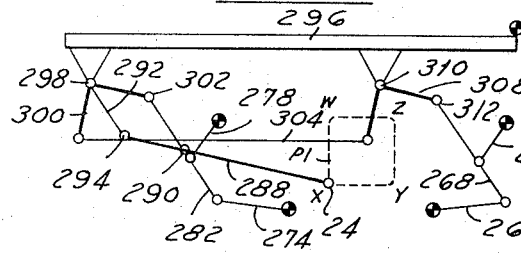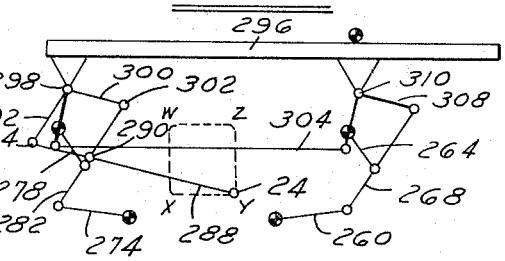

PRIME MOVER MECHANISM AND TRANSFER SYSTEM

This invention relates to a Prime Mover Mechanism and Transfer System and more particularly to a drive system and driven system which can provide a lift and carry type transfer system as presently widely used in the field of automatic part processing.

It is an object of this invention to provide a basic prime mover mechanism which sequentially generates four distinct acceleration-deceleration cycles in an essentially square pattern.

It is a further object of this invention to provide the square movement mechanism with design characteristics which permit modification of the amount of overlap between successive legs of the motion.

It is a further object of this invention to incorporate sufficient and partially inherent reduction gearing into the square movement mechanism to eliminate the need for an external gear reducer.

It is a further object of this invention to provide a simple generalized linkage design which transforms the generated square movement pattern into a rectangular movement pattern of variable aspect ratio.

It is a further object of this invention to provide an alternate mechanical system employing the same kinematic principles and equations but employing a significantly different type of mechanical construction.

It is a further object of this invention to incorporate into the basic square motion generating system a means by which the dynamic output characteristics may be varied over an extremely wide range with all legs having symmetrical characteristics.

In the field of automatic workpiece transfer from station to station or from operation to operation, many applications arise in which it is necessary to lift the workpieces essentially vertically upward out of their work station locators, then carry them forward one station in an essentially horizontal direction, then lower them into the next work station locators in an essentially vertical downward movement. Finally, the transfer system returns to its initial starting point by retracting horizontally at a level below that at which the workpiece interchanges took place. Such a transfer system usually consists of one or more bars which reciprocate in a horizontal direction. These bars are mounted in rollers or in an equivalent guiding system which in turn moves up and down. On the bars are mounted a family of support nests and locators which engage the workpieces on the vertically upward stroke of the system, maintain their proper orientation during the forward stroke of the transfer bars, and then redeposit the workpieces into the station nests and locators during the downward stroke of the system.

Transfer systems utilizing this four-step pattern are in widespread and common usage in a variety of processing lines, e.g., machining, welding, and assembly. Most generally, these motions are generated by complex systems utilizing separate cylinders or other prime movers to actuate the horizontal and vertical motions. Such systems are complex because of the large number of external control components and as limit switches, relays, valves, and pumps. They are also relatively slow, since only one movement must complete its stroke as indicated by a limit switch before the next sequential movement is initiated.

In a smaller number of cases, the four element movement is generated by a single multigroove cam or by a pair of cams suitably mechanically linked together. Such systems are superior to the cylinder actuated types but have the disadvantage of being both expensive to design and build and cumbersome to install.

The invention described herein is superior to both types of movement systems outlined above since it is faster than the cylinder system, less expensive than the cam system, and less complex than either.

It is a further object of this invention to adapt the basic prime mover mechanism to a mechanical indexing drive system which is capable of generating nominally independent multiple outputs, each of which is smoothly accelerated and decelerated along its line of motion and through its required stroke.

It is a still further object to provide a prime mover mechanism and indexing drive system which drives two outputs whose movements are sequentially interrelated nominally as follows: the first output is extended through its stroke while the second output is in nominal dwell; thereafter, the second output is extended through its stroke while the first output is in nominal dwell; thereafter, the first output is returned through its stroke while the second output is in nominal dwell; and, finally, to complete a cycle, the second output is returned while the first output is in nominal dwell.

It is a further object of this invention to provide an indexing drive system in which each of the aforesaid output movements is smoothly accelerated from a nominal dwell position to its approximate midstroke position at which point a maximum velocity is reached and then smoothly decelerated to its nominal dwell during the second half of its stroke.

It is a further object of this invention to provide an indexing drive system in which the aforesaid output movements overlap slightly, i.e., one movement has not fully reached a true stop position when the succeeding movement starts its stroke.

It is a further object of this invention to provide an overall movement system in which the basic prime mover may remain unchanged from application to application, the different requirements being met with straightforward output system changes.

Other objects and features of the invention will be apparent in the following description, claims, and accompanying drawings in which the principles of operation and use are set forth in connection with the best mode presently contemplated for the practice of the invention.

DRAWINGS accompany the disclosure and the various views thereof may be briefly described as:

FIG. 1, an outside elevation of the drive mechanism.

Figure 2:
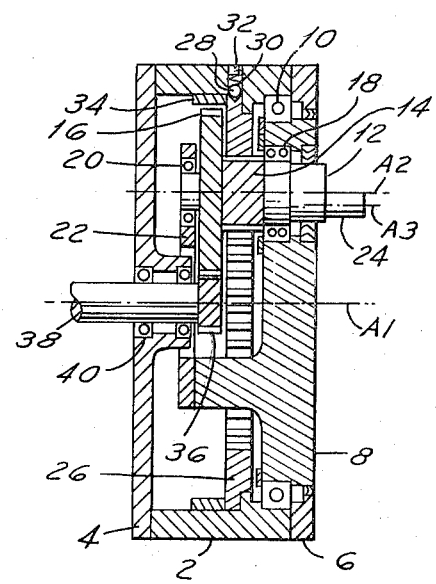

FIG. 2, a sectional view on line 2—2 of FIG. 1.

Figure 3:
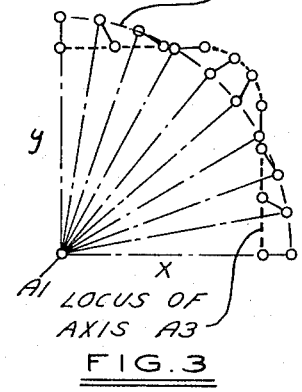

FIG. 3, a diagrammatic view of one quadrant output of the drive mechanism.

Figure 4:
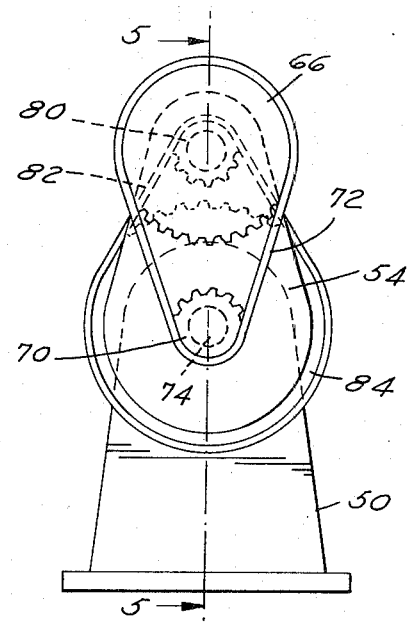

FIG. 4, an elevation of a modified embodiment of the invention using a chain or belt drive.

Figure 5:
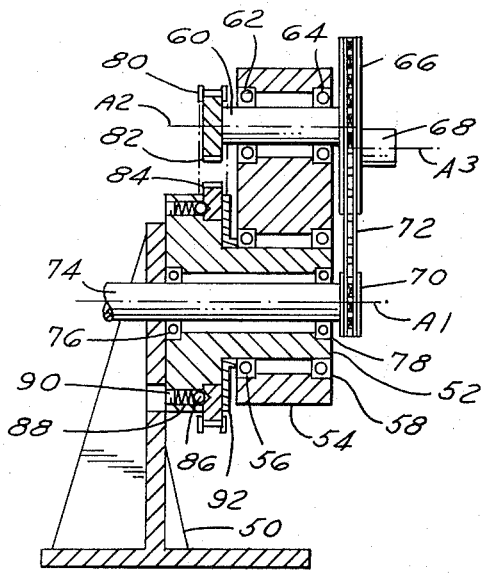

FIG. 5, a sectional view of the embodiment shown in FIG. 4 taken on line 5—5.

Figure 6:
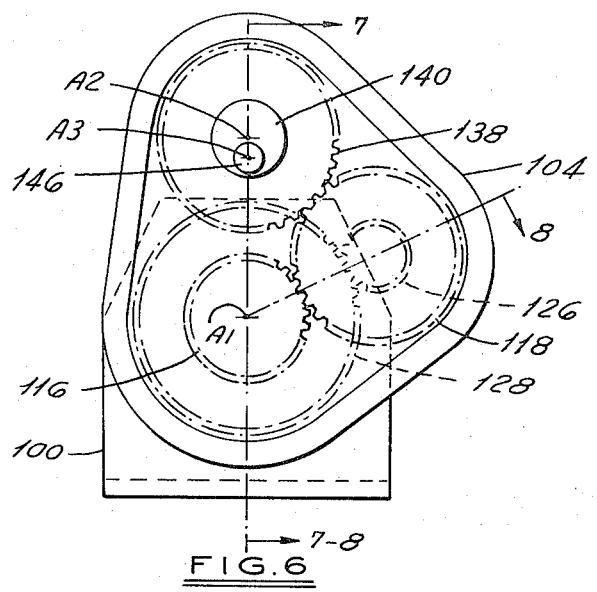

FIG. 6, an elevation of a second modification of the drive mechanism.

Figure 7:
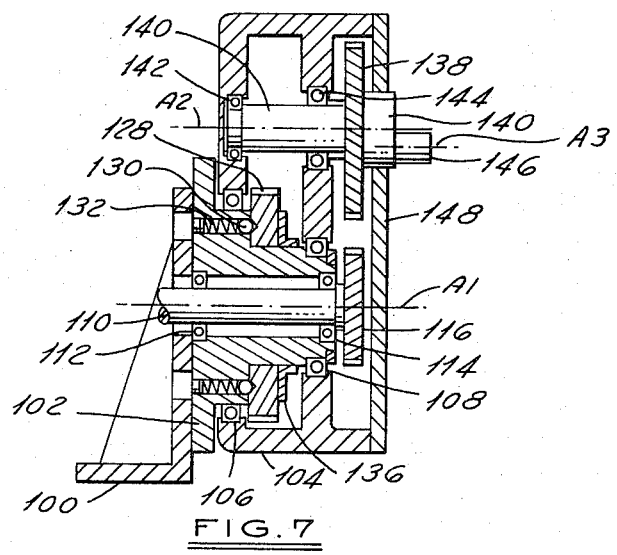

FIG. 7, a sectional view on line 7—7 of FIG. 6.

Figure 8:
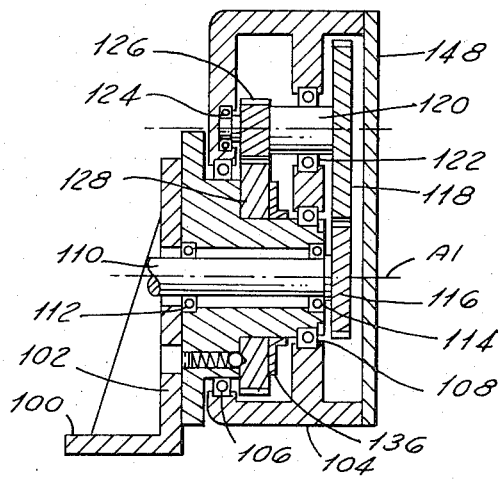

FIG. 8, a sectional view on line 8—8 of FIG. 6.

Figure 9:
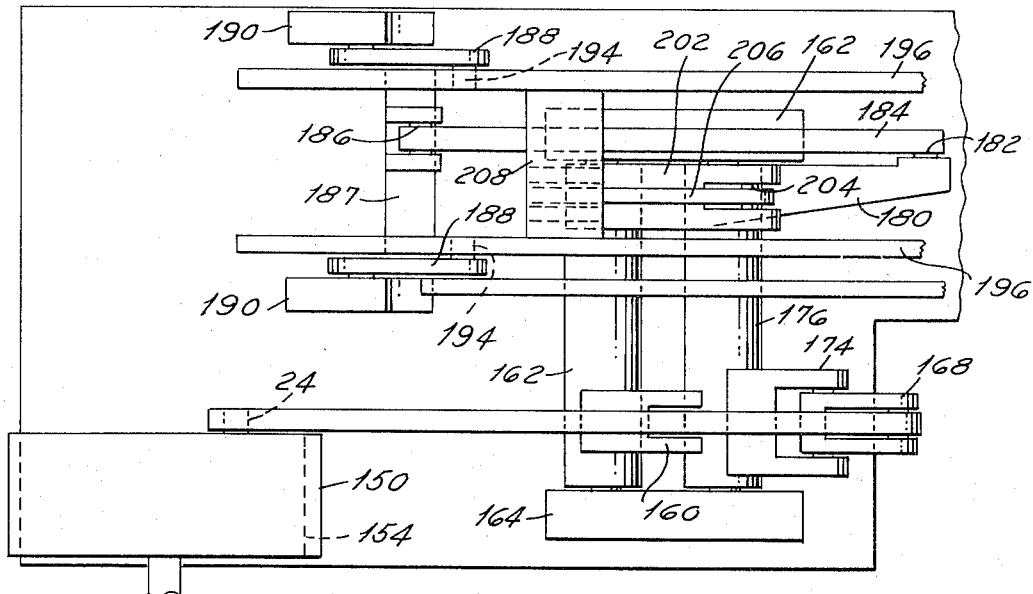

FIG. 9, a plan view of a linkage mechanism to be driven by the prime mover mechanism.

Figure 10:
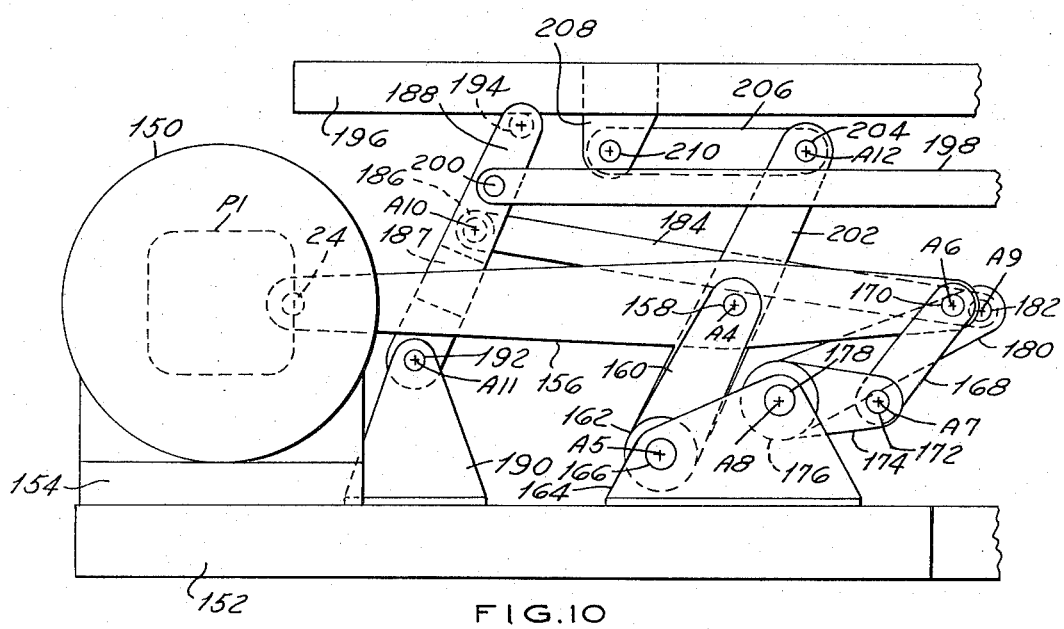

FIG. 10, a side elevation of the linkage shown in FIG. 9.

Figure 11:
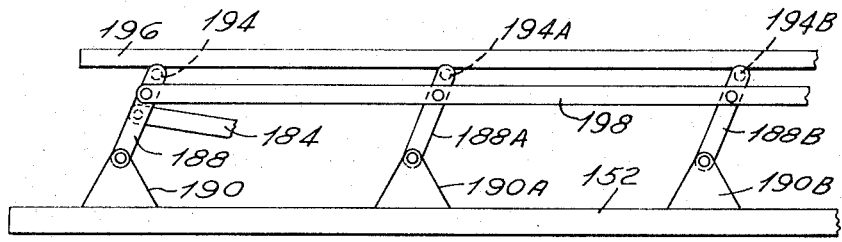

FIG. 11, a separate view of a portion of the lift and carry mechanism.

FIGS. 12 to 15, a series of diagrammatic presentations of various positions of the prime mover and associated linkage.

FIGS. 16 and 17, a plan and elevational view, respectively, of a simplified linkage system.

FIGS. 18 to 21, diagrammatic views of the linkage system of FIG. 17 in various positions of a cycle.

FIGS. 22 and 23, a plan and elevational view, respectively, of a third linkage system for use with the basic prime mover mechanism.

FIGS. 24 to 27, diagrammatic views of the linkage system of FIG. 23 in various positions of a cycle.

Figure 28:
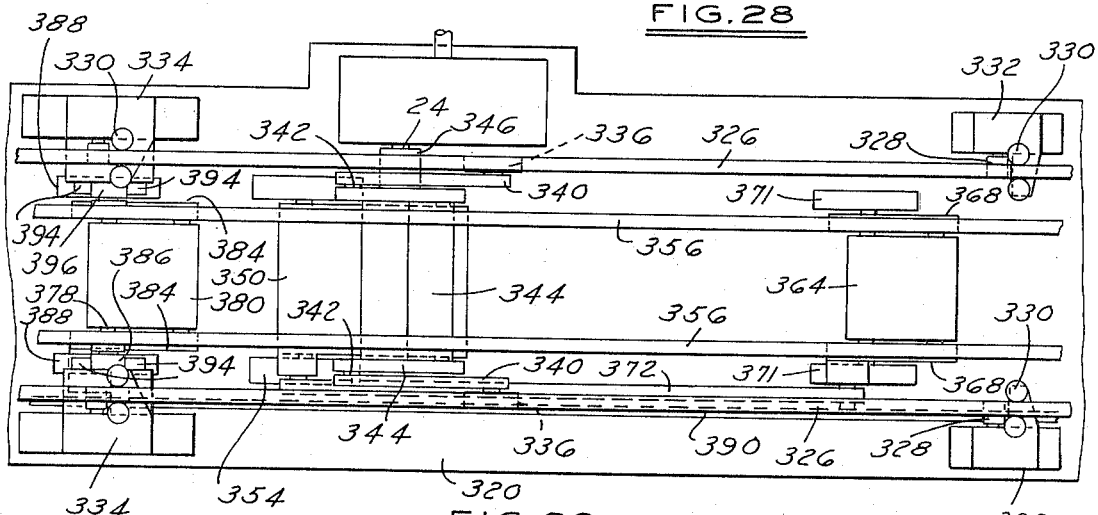
Figure 29:
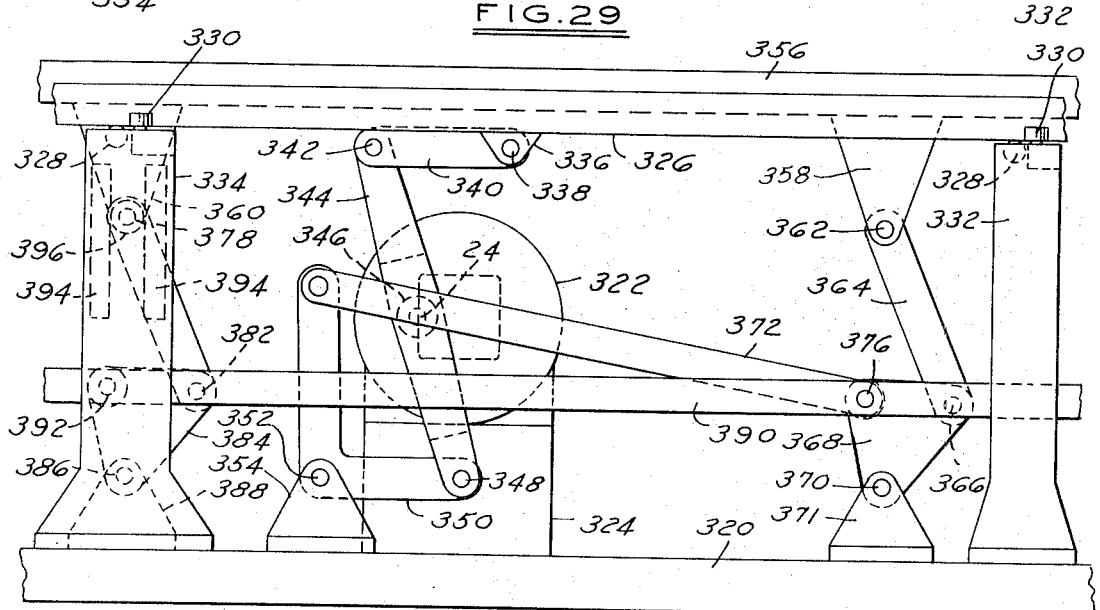

FIGS. 28 and 29, a plan and elevational view, respectively, of a fourth linkage system for use with the basic prime mover.

FIGS. 30 to 33, diagrammatic views of the linkage system of FIG. 29 in various positions of a cycle.

Referring to FIGS. 1 and 2, the case assembly is made up of a case 2, an input cover 4 and an output cover 6. A planetary carrier 8 is mounted in the case 2 through a double contact bearing 10. A planetary cluster is made up of a planetary shaft 12, a planetary gear 14, and a cluster gear 16 which rotate as a unit about axis A2; the planetary shaft 14 is mounted through bearing 18 in the planetary carrier 8 and through bearing 20 in the planetary carrier extension plate 22 which is rigidly bolted to the planetary carrier 8. An output shaft 24 is mounted to the planetary shaft 12 with a predetermined eccentricity, i.e., the centerline A3 of the output shaft 24 is displaced from the centerline A2 of the planetary shaft 12.

The planetary gear 14 is suitably formed to mesh with an internal gear 26 mounted in the case 2. This gear 26 is concentric with the axis A1 of the planetary carrier 8; this gear 26 is normally prevented from rotating within the case 2 through the action of the detent assembly consisting of ball 28, spring 30, and retainer 32. The ball 28 seats in a conical pocket in the gear 26, retaining the gear from rotating until a certain predetermined load is reached; if this load is exceeded, the gear 26 is free to rotate. The gear 26 is axially positioned in the case by retainer ring 34.

An input gear 36 is mounted on an input shaft 38 mounted in bearings 40 in the input cover 4. This input gear 36 is suitably formed to mesh with the cluster gear 16.

When the input shaft 38 is rotated by some external drive means, it causes the cluster gear 16 to rotate about the (moving) axis A2, thereby causing the planetary gear 14 to rotate. This causes the planetary carrier 8 to rotate about the axis A1. For the functions intended, the pitch diameter of the planetary gear 14 will be made substantially 1/4 of the pitch diameter of the internal gear 26. Therefore, for each revolution of the planetary carrier 8 about axis A1, the shaft 12 will make four revolutions about the moving axis A2.

The output shaft 24 is concentric about an axis A3 which is displaced from the axis A2 by some distance which is defined as the eccentricity. More particularly, to eliminate the effects of scale, the eccentricity will be defined as the ratio of the distance from A2 to A3 to the distance from axis A1 to A2. When this value is chosen in the approximate range of one-ninth to two-ninths, a very useful output may be derived from the translational output characteristics of the output shaft 24.

An example of the translational behavior of the shaft 24 during one rotation of the planetary gear 14 with respect to the internal gear 26 may be visualized by reference to the quadrant view of FIG. 3, a series of superimposed schematic sketches of the mechanism taken at 10° intervals of rotation of the planetary carrier 8. A total of 90° of planetary carrier 8 rotation are shown, representing 360° of planetary gear 14 rotation with respect to the planetary carrier. It will be understood that the behavior of the system in each of the other three quadrants will be symmetrical with that of the single quadrant shown in FIG. 3. The eccentricity between axis A3 and A2 utilized in the mechanism in FIG. 3 is one-eighth of the distance from the axis A1 to the axis A2. For reference purposes, two axes of motion, X and Y are shown.

During a complete rotation of the planetary carrier 8, the path followed by the axis A3 will be a near square with four equal substantially straight sides and four rounded corners. Equally important, if the planetary gear 14 rotates at a constant angular velocity, the movement characteristics of the axis A3 along its path is such that it starts each side with a near zero velocity component along the axis parallel to that side, smoothly accelerates to a maximum velocity during its traverse of that side, reaches a peak velocity at the center of that side, smoothly decelerates as it approaches the next corner, and finally achieves a near zero velocity component along the axis parallel to that side as it reaches the end of the corner.

Essentially then, the movement pattern of the axis A3 may be considered as four sequential legs, each of which is substantially straight, and along which the axis A3 accelerates and decelerates reaching a peak velocity along that leg at the center of that leg starting at a near zero velocity at the beginning of that leg and reaching a near zero velocity at the end of that leg.

A second embodiment of the mechanism is shown in FIGS. 4 and 5. Referring to these figures, a frame 50 supports a base ring 52. A rotating arm 54 is mounted on the base ring 52 through bearings 56 and 58 through which it rotates on a fixed axis A1. A planetary shaft 60 is mounted in the outboard end of the arm 54 through bearings 62 and 64 and rotates on a moving axis A2.

A sprocket 66 is rigidly attached to shaft 60, and an output shaft 68 is rigidly attached to the assembly made of shaft 60 and sprocket 66. This output shaft rotates on an axis A3 which is displaced from and is therefore eccentric to axis A2.

An input sprocket 70 rotating on the axis A1 drives the sprocket 66 through a chain 72. The sprocket 70 is in turn mounted on and driven by an input shaft 74 mounted in the base ring 52 through bearings 76 and 78.

A planetary sprocket 80 is rigidly attached to shaft 60. A chain 82 connects the sprocket 80 to a stationary sprocket 84 which is mounted on the base ring 52. Two ball detent assemblies, consisting of balls 86, springs 88, and retainers 90 mounted in the base ring 52 engage conical seats in the sprocket 84 and prevent it from rotating on the base ring 52 until a preset overload torque is reached. A retainer ring 92 keeps the sprocket 84 properly seated on the base ring 52. The tooth ratio between the sprocket 80 and the sprocket 84 is 1 to 4, i.e., the sprocket 84 has four times as many teeth as the sprocket 80, and the pitch diameter of the sprocket 84 is approximately four times as large as the pitch diameter of the sprocket 80. Therefore, for each revolution of the arm 54 about the axis A1, the shaft 60 rotates four complete revolutions about the axis A2.

When the input shaft 74 is rotated by some external drive means, it causes the sprocket 70 to drive the sprocket 66 through the chain 72. This in turn causes the shaft 60 to rotate about its axis A2, and the sprocket 80 in mesh with chain 82 causes the arm 54 to rotate about axis A1. Since the sprocket 84 has four times as many teeth as sprocket 80, the arm 54 will rotate once around axis A1 for every four revolutions of the shaft 80 with respect to arm 54.

It can be seen, therefore, that the mechanism of FIGS. 4 and 5 is the kinematic equivalent of the mechanism of FIGS. 1 and 2, and that the path of the output shaft 68 and its axis A3 will be identical with that described by the output shaft 24, if the generating distances of axis A1 to axis A2 and the eccentricities are identical.

A third embodiment of this same mechanism is shown in FIGS. 6, 7 and 8. The key characteristics of the mechanisms previously described is that an output shaft on an axis A3 rotates about a second moving axis A2 at a relative angular rate four times greater and in the opposite direction than that axis A2 rotates about a fixed axis A1.

This same effect is accomplished in a different way in the following embodiment. Referring to FIGS. 6, 7 and 8, a frame 100 supports a base ring 102 which in turn rotatably supports a case 104 through bearings 106 and 108.

An input shaft 110 is supported in the base ring 102 through bearings 112 and 114. Both the input shaft 110 and the case 104 rotate about the fixed axis A1. An input gear 116 is mounted on the input shaft 110, and meshes with an intermediate gear 118 mounted on an intermediate shaft 120 which is mounted in the case 104 through bearings 122 and 124. A drive gear 126 is mounted on shaft 120, and is suitably formed to mesh with a stationary gear 128 mounted on the base ring 102. The gear 128 is maintained in a stationary position, until some predetermined overload torque is reached, by two ball detent assemblies consisting of balls 130, springs 132, and retainers 134, mounted in the base ring 102. A spacer ring 136 is fastened to the base ring 102 and maintains the axial position of the gear 128.

The intermediate gear 118 also meshes with gear 138 mounted on shaft 140 rotating on axis A2 in bearings 142 and 144 mounted in the case 104. The output shaft 146 is mounted to the shaft 140 and rotates about an axis A3 which is eccentric to the axis A2. A cover 148 is bolted to the case 104 and is used to seal the entire gear train.

It can be seen that when the input shaft 110 is rotated, the gear 116 causes the gear 118 to rotate. This in turn causes the gear 126 to rotate, driving the case 104, and all components mounted therein in a rotary motion about axis A1, since the gear 126 is in mesh with the stationary gear 128. The only restriction is that the pitch diameter of the gear 116 be different than the pitch diameter of the gear 128.

The gear 118 also drives the gear 138 causing the shaft 140 to rotate about the moving axis A2 in the opposite direction as the direction in which the entire case 104 rotates about axis A1. If we now define the pitch diameters of the gears as follows:

P.D. Gear 126 = $P_1$

P.D. Gear 128 = $P_2$

P.D. Gear 118 = $P_3$

P.D. Gear 138 = $P_4$

It can be seen that if the following equation is satisfied $$P_2/P_1 \times P_3/P_4 = 4$$

then the shaft 140 will rotate four times about axis A2 relative to the case 104 during a single rotation of the case 104 about axis A1 relative to the base ring 102, and as previously shown, the rotations are in the opposite directions.

Therefore, for equal parameters which are the distance from axis A1 to axis A2 and the distance from axis A2 to axis A3, the kinematic behavior of the axis A3 of the shaft 146 will be identical with the behavior of the axis A3 in the two previously described mechanisms.

In all three embodiments, it will be noted that the reaction member, as exemplified by gear 26, or sprocket 84 or gear 128, is restrained from rotating with respect to the base by a ball detent type clutch system. The purpose of this system is to provide an overload release point which will slip in the event the output shaft encounters an excessive load along any of the four legs of its movement.

Kinematic analysis reveals an extremely large variation in the mechanical advantage between input torque and output thrust over various portions of the cycle. Hence an overload system anywhere in the input train would not be consistently effective. However, the relationship between output thrust and torque on the reaction member is remarkably consistent for all portions of the cycle. Therefore, the overload release system must be applied to the reaction member to be properly and consistently effective.

These innate characteristics are of considerable value in generating the sequential motion pattern demanded by a class of workpiece transferring systems commonly known as "lift and carry" systems, and by another class of workpiece transferring systems in which the workpiece is lifted into work position at the forward end of the transfer stroke.

In connection with FIGS. 9 and 10 which illustrate the application of the foregoing square drive mechanisms, it will be understood that the "square" schematic representation of the square drive mechanism is representative of any one of the previously described three embodiments. Furthermore, the output path of the output shaft on axis A3 is shown as a square with slightly rounded corners which is a fair representation of the path as shown being generated in FIG. 3.

Referring to FIGS. 9 and 10, the square drive 150, as previously described, is mounted to the base 152 through an appropriate riser 154. The output shaft 24 moves along a path P1. The output shaft 24 drives a master link 156 which is connected by pin 158 on axis A4 to a fulcrum link 160, which in turn is rigidly attached to a torque tube 162 which is pivotally supported in riser blocks 164 by shaft 166 on axis A5.

The link 156 is also pin connected to a link 168 through pin 170 on axis A6. The other end of link 168 is connected by pin 172 on axis A7 to link 174, which in turn is rigidly supported on torque tube 176. The torque tube 176 is in turn pivotally supported by shaft 178 on axis A8 mounted in riser blocks 164.

The torque tube 176 also rigidly supports a link 180, which is connected by pin 182 on axis A9 to link 184. The other end of link 184 is connected by pin 186 on axis A10 to a lift link assembly. This lift link assembly is a welded H-shaped structure having a cross-bar 187 and two vertical links 188 supported from the base 152 by two riser brackets 190 and shaft 192 on axis A11. Each vertical extension 188 of the lift assembly supports a roller 194, on which the transfer bars 196 are supported. The lift link assembly also drives an extension link 198 through pin 200 connected to vertical links 188, the purpose of which will be subsequently explained.

The torque tube 162 also rigidly supports a link 202, which is connected by a pin 204 on axis A12 to a drive link 206. The other end of the link 206 is connected to a coupling bracket 208 through pin 210. The bracket 208 is bolted to the transfer bars 196 and is used to drive them back and forth through their horizontal stroke.

As noted above, the transfer bars 196 are supported on rollers 194 mounted on the link 188. Additional sets of rollers are required to support the transfer bars 196 over their entire length which may be considerable. At least one additional set of rollers is required. The number provided depends on the length of the transfer bars 196.

FIG. 11 illustrates how this is accomplished. In addition to the primary lift link 188, a group of one or more slaved lift links, 188A, 188B, etc. are provided. Each supports additional rollers 194A, 194B, etc. and is supported from the base 152 by a riser bracket 190A, 190B, etc. such that the pivot points of the links 188, 188A, 188B, etc. lie substantially in the same horizontal plane. The angular movement of the links 188, as driven by link 184, is transmitted to the links 188A, 188B, etc. so that all have the same angular position as links 188 and therefore constitute a multiple parallelograms which supports the transfer bars 196 on multiple rollers, which rise and fall in unison as determined by the movement of links 188. This common automation technique is relevant only for the complete understanding of the function of the mechanism of FIGS. 9 and 10.

The sequencing of the linkage of FIGS. 9 and 10 may be most easily understood by reference to FIGS. 12, 13, 14 and 15, a set of sequential linkage schematics showing the positions of the linkage during four phases of the input and output motion. In FIGS. 12-15, the three axes which are fixed, A5, A8 and A11 are represented by quarter shaded circles to assist the interpretation; in addition, a similar reference bench mark is provided as a fixed point of comparison.

FIG. 12 shows the position of the linkage with the transfer bar 196 in its lowered and returned position which is the normal starting point of a transfer cycle. The output shaft 24 is at point W of its path P1.

As the output shaft traverses from W to X, the transfer bar 196 raises through its vertical stroke, reaching the condition as shown in FIG. 13. The link 156 acting as a lever pivot about the axis A4 where it is joined to fulcrum link 160, causing the link 168 and link 174 to rotate the torque tube 176 in a counterclockwise direction about axis A8. Link 180 attached to the torque tube 176 also rotates CCW (counterclockwise) about axis A8, thereby rotating link 188 CCW about A11, through link 184, raising the transfer bar 196. During this movement, link 160, torque tube 162, and link 202 are substantially stationary so there is little horizontal movement of the transfer bar 196. The slight movement of these components can be compensated for through the proper choice of the length of link 206.

As the output shaft traverses from X to Y, the transfer bar 196 moves forward through its horizontal stroke reaching the condition as shown in FIG. 14. The link 156, operating in tension, causes link 160 to rotate CCW about axis A5. This causes the torque tube 162 and the link 202 attached to it to rotate CCW about axis A5. The link 202 drives the transfer bar 196 forward through link 206. During this interval there is substantially no vertical movement of the transfer bar 196 since the torque tube 176 remains substantially stationary. This is so if the length of link 168 is properly chosen to compensate for the arcuate path of the point on link 156 to which it is connected.

As the output shaft traverses from Y to Z, the transfer bar 196 is lowered through its vertical storke reaching the condition as shown in FIG. 15. The link 156 again acting as a lever pivots about its joint A4 with link 160 causing the link 168 and link 174 to rotate the torque tube 176 in a clockwise direction about axis A8. Link 180 attached to the torque tube 176 also rotates CW (clockwise) about axis A8, thereby rotating link 188 CW about axis A11, through link 184, lowering the transfer bar 196. During this interval, link 160, torque tube 162 and link 202 are substantially stationary so there is little horizontal movement of the transfer bar 196. The slight oscillation of the torque tube 162 is compensated for through the proper choice of the length of link 206.

As the output shaft traverses from Z to W, the transfer bar 196 returns through its horizontal stroke again reaching the condition shown in FIG. 12, completing the four step cycle of up, forward, down, and return. The link 156 acting in compression causes link 160 to rotate CW about axis A5. This causes the torque tube 162 and the link 202 attached to it to rotate CW about axis A5. The link 202 drives the transfer bar 196 through its return stroke through link 206. During this interval, there is substantially no vertical movement of the transfer bar 196 since the torque tube 176 remains substantially stationary. This is again the case if the length of link 168 is properly chosen to compensate for the arcuate path of the point on link 156 to which it is connected.

It can be seen that the overall linkage is divided into two basic assemblies: A first assembly which resolves the motion of the output shaft 24 into two interrelated but independent movements as represented by the rotation of the two torque tubes 162 and 176; and a second assembly which converts the rotation of one torque tube into the vertical motion of the transfer bars and converts the rotation of the other torque tube into the horizontal motion of the transfer bars. With the proportions shown in FIGS. 12-15, it can be seen that the horizontal movement of the transfer bar is approximately two times the length of any one side of the generated square, while the vertical movement of the transfer bar is approximately one half of the length of such a side.

These magnification or reduction factors may easily be modified to suit various requirements. Changing the length of link 202 changes the horizontal stroke; and changing the length of link 180 and/or link 188 changes the vertical stroke.

A simplified but less flexible embodiment is shown in FIGS. 16 and 17. In this application, the horizontal stroke of the transfer bars is substantially the same as one side of the generated square, while the vertical stroke is less than such a length.

Referring to FIGS. 16 and 17, a base 210 supports the square drive 212 in any one of its three embodiments. The base 212 also supports four riser brackets 214, on which in turn are mounted four rails 216.

The output shaft 24 of the square drive drives an offset box link 218. This link 218 carries a shaft 220 on which are mounted two flanged rollers 222. A second shaft 224 is mounted in link 218 and supports two riser brackets 226, which in turn carry the transfer bars 228. At their other end the transfer bars 228 are supported by two additional riser brackets 230. These brackets 230 are supported by a shaft 232 mounted in a bellcrank link 234. One end of the link 234 is supported by a shaft 236 which carries two flanged rollers 238 which roll on the rails 216. The angular position of the link 234 with respect to the shaft 232 is controlled by a tie link 240 which is connected at one end to link 234 by pin 242 and at its other end to link 218 by pin 244. The angular and distance relationship between pin 244 and shafts 224 and 220 with respect to link 218 are identical with the angular and distance relationships between pin 242 and shafts 232 and 236 with respect to link 24. Furthermore, the distance between pin 242 and pin 244 on link 240 is the same as the distance between shaft 224 and shaft 232 on the rigid assembly made up of risers 226, transfer bars 228, and risers 230. Therefore, as link 218 is rotated about shaft 224, the link 234 is rotated an identical amount about pin 232.

The sequence pattern of the linkage may be visualized by reference to FIGS. 18, 19, 20 and 21, a set of sequential linkage schematics showing the positions of the linkage during four phases of the input and output motion. A reference bench mark is again provided as a fixed point of comparison.

FIG. 18 shows the position of the linkage with the transfer bar 196 in its lowered and returned position which is the normal starting point of a transfer cycle. The output shaft 24 is at point W of its path P1.

As the output shaft traverses from W to X, the transfer bars 228 are raised through their vertical stroke reaching the condition as shown in FIG. 19. The link 218 acting as a lever with the rollers 222 as a fulcrum, rotates in a counterclockwise direction lifting one end of the transfer bars 228. This angular rotation of link 218 causes an identical rotation of the link 234 through link 240, raising the other end of the transfer bars 228 an equal amount. During this interval, there is very little horizontal movement of the transfer bars 228.

As the output shaft traverses from X to Y, the transfer bars 228 move forward through their horizontal stroke, while remaining in their elevated position reaching the condition as shown in FIG. 20. The link 218 acting in tension (in addition to the bending it is subject to in all positions) pulls the entire linkage assembly and transfer bars 228 forward on the rollers 222 and 238 through a stroke substantially equal to the distance from X to Y. During this interval there is no angular movement of link 218 or link 234 and there is substantially no vertical movement of the transfer bars 228, as they advance forward in their raised position.

As the output shaft traverses from Y to Z, the transfer bars 228 are lowered through their vertical stroke reaching the condition shown in FIG. 21. The link 218 again acting as a lever with the rollers 222 as a fulcrum, rotates in a clockwise direction lowering one end of the transfer bars 228. This angular rotation of the link 218 causes an identical rotation of the link 234 through link 240, lowering the other end of the transfer bars an equal amount. During this interval, there is again very little horizontal movement of the transfer bars 228.

As the output shaft traverses from Z to W, the transfer bars 228 are returned through their horizontal stroke, again reaching the condition shown in FIG. 18, and completing the four-step cycle of lift, forward, down and return. The link 218, acting in compression pushes the entire linkage assembly and transfer bars 228 through its return stroke on the rollers 222 and 238. During this interval, there is no angular movement of link 218 or link 234, and there is substantially no vertical movement of the transfer bars 228 as they return through their horizontal stroke in their lowered position.

A third embodiment of a system to convert the square movement into a suitable lift and carry movement for a transfer bar is shown in FIGS. 22 and 23.

Referring to these FIGS. 22 and 23, a base 250 supports the square generator 252 through a riser 254. The base also supports two linkage support brackets 256 and 258.

Bracket 258 supports a link 260 through a shaft 262. It also supports a link 264 through a pin 266. A guide link 268 is connected near its center to link 264 through a shaft 270. At its lower end the link 268 is connected to link 260 through a shaft 272. Considering only this sub-assembly of links 260, 264 and 268 as assembled on bracket 258, it can be seen that link 268 can be moved through a considerable angular range and with such movement that its upper end moves along a substantially straight horizontal line.

The linkage sub-assembly mounted on bracket 256 is essentially a mirror image of the linkage sub-assembly mounted on the bracket 258. A link 274 is supported from bracket 256 through shaft 276; and a link 278 is supported from bracket 256 through pin 280. A guide link 282 is connected near its center to link 278 through a shaft 284. At its lower end the link 282 is connected to link 274 through shaft 286. This linkage sub-assembly on bracket 256 also causes the upper end of link 282 to move in a substantially straight horizontal line when link 282 is angularly moved through some angle.

The link 282 is connected to and powered by link 288 which is connected to link 282 by shaft 290. At one end link 288 is driven by the output shaft 24, and at its other end, link 288 is connected to a lift link 292 by shaft 294. The other end of link 292 is connected to the transfer bar through shaft 298. This shaft 298 also connects bellcrank link 300 to the transfer bar 296. One end of the bellcrank link 300 is connected to the link 282 through shaft 302. The other end of bellcrank link 300 is connected to a tie link 304 through a shaft 304.

At its other end, the transfer bar 296 is supported from a bellcrank link 308 through shaft 310. One end of this bellcrank link 308 is connected to link 268 through shaft 312. The other end of link 308 is connected to link 304 through shaft 314. The angular and distance relationships between shafts 310, 312 and 314 in bellcrank link 308 are identical with the angular and distance relationships between shafts 298, 302 and 306 in bellcrank link 300. Furthermore, the distance between shafts 298 and 310 on the transfer bar 296 is identical with the distance between shafts 306 and 314 on the link 304. Therefore, it can be seen that any angular movement of the link 300 about shaft 298 causes an equal angular movement of the link 308 about shaft 310.

The sequence pattern of the linkage may be visualized by reference to FIGS. 24, 25, 26 and 27, a set of sequential linkage schematics showing the positions of the linkage during four phases of the input and output motion. For convenience, the four fixed pivot points are identified by quarter shaded circles. In addition, a reference bench mark is provided as a fixed point of comparison.

FIG. 24 shows the position of the linkage with the transfer bar 296 in its lowered and returned position which is the normal starting point of a transfer cycle. The output shaft 24 is at point W of its path P1.

As the output shaft traverses from W to X, the transfer bar 296 is raised through its vertical stroke reaching the condition shown in FIG. 25. During this movement, the link 288 pivots CW about shaft 290 on link 282 which remains substantially stationary. The link 292 connected to link 288 by shaft 294 moves the shaft 298 and transfer bar 296 upward. This in turn causes the link 300 to rotate clockwise about shaft 298 since the link 300 is attached through shaft 302 to the substantially stationary link 282. This clockwise rotation of the link 300 causes an equal rotation of the link 308 about shaft 310, through the link 304. The CW rotation of the link 308 about shaft 310 in turn lifts the other end of the transfer bar, since the link 308 is connected to link 268 through shaft 312. During this interval, the link 268 and its supporting links 264 and 260 also remain substantially stationary. The transfer bar 296 therefore is raised through its vertical stroke with very little horizontal movement.

As the output shaft 24 traverses from X to Y, the transfer bar 296 moves forward through its horizontal stroke reaching the condition shown in FIG. 26. During this movement, the link 288 operating in tension causes the link 282 to rotate clockwise advancing the transfer bar. The link 268 swings clockwise also while providing support for the other end of the transfer bar. The link 288 experiences very little angular movement as the output shaft 24 moves from X to Y. Accordingly, the link 300 and the link 308 also experience very little angular movement during this interval and the transfer bar 296 remains substantially stationary in its raised vertical position as it is moved through its forward horizontal stroke.

As the output shaft 24 traverses from Y to Z, the transfer bar 296 is lowered through its vertical stroke reaching the condition shown in FIG. 27. During this movement, the link 288 pivots counterclockwise about shaft 290 on link 282 which remains substantially stationary. The link 292 connected to link 288 by shaft 294 moves the shaft 298 and transfer bar 296 downward. This in turn causes the link 300 to rotate counterclockwise about shaft 298 since the link 300 is attached through shaft 302 to the substantially stationary link 282. This counterclockwise rotation of the link 300 causes an equal rotation of the link 308 about shaft 310 through the link 304. This counterclockwise rotation of the link 308 about shaft 310 in turn lowers the other end of the transfer bar, since the link 308 is connected to link 268 through shaft 312. During this interval the link 268 and its supporting links 264 and 260 also remain substantially stationary. The transfer bar 296, therefore, is lowered through its vertical stroke while experiencing very little horizontal movement.

As the output shaft 24 traverses from Z to W, the transfer bar 296 returns through its horizontal stroke again reaching the condition shown in FIG. 24, and completing the four-step cycle of raise, advance, lower, return. During this movement, the link 288 operating in compression causes the link 282 to rotate counterclockwise returning the transfer bar. The link 268 swings counterclockwise also while providing support for the other end of the transfer bar. The link 288 again experiences very little angular movement as the output shaft 24 moves from Z to W. Accordingly, the link 300 and the link 308 also experience very little angular movement during this interval and the transfer bar 296 remains substantially stationary in its lowered vertical position as it is moved through its return horizontal stroke.

From the foregoing descriptions, it is clear that the link described magnifies the horizontal movement and reduces the vertical movement as compared to the basic width or length of one leg of the generated square. The position of shaft 290 on link 282 determines the horizontal magnification and the position of shaft 290 on link 288 determines the vertical reduction.

In each of the foregoing systems, the output movement of the transfer bar is an up, forward, down, and return pattern which is ideal for so-called walking beam or lift and carry transfers. There is another class of transfer systems which also requires a four-step motion but different from the lift and carry technique. In these systems, the workpieces are lifted vertically upward from their transfer position to reach the work station. At the completion of a work cycle, the workpieces are lowered onto the transfer bars. The transfer bars advance all workpieces forward one station. The workpieces are raised to the work stations and the transfer bars return in an empty condition. Such a system requires two sets of bars. One set reciprocates only and does not move up and down. The second set moves only up and down and does not reciprocate. The square drive in any of its three embodiments is also ideally suited to power such a system, again providing completely automatic sequencing of the four movements.

Such a system is shown in FIGS. 28 and 29. A base 320 supports the square drive 322 through a riser 324. A pair of reciprocating transfer bars 326 is supported on rollers 328 and guided by rollers 330 mounted in roller stands 332 and 334, which are mounted on the base 320. The transfer bars are driven through brackets 336, shafts 338 and links 340. The links 340 are in turn driven through shafts 342 from a beam link 344. The link 344 is a wide H section detail having an integral boss 346 on one side which is driven by the output shaft 24 of the square drive 322. The lower end of link 344 is supported through a shaft 348 from a wide bellcrank link 350. This link 350 is in turn supported from the base through shaft 352 and two riser brackets 354.

The lift rails 356 are supported by riser brackets 358 and 360. Riser brackets 358 are in turn supported by shaft 362, upper toggle link 364, shaft 366, lower toggle link 368, shaft 370 and brackets 371 which are mounted on the base 320. The lower toggle link 368 is driven by bellcrank link 350 through link 372, which is connected to link 350 through shaft 374 and to the link 368 through shaft 376.

The riser brackets 360 are supported by shaft 378, upper toggle link 380, shaft 382, lower toggle link 384, shaft 386 and brackets 388 which are mounted on the base 320. The geometric proportions of the linkage 380 and 384 are identical with the geometric proportions of the linkage 364 and 368. Furthermore, the link 384 is connected to link 368 by a tie link 390, which is connected to link 368 by shaft 376 and to link 384 by shaft 392.

The lift rails 356 are constrained to move in a true vertical line by four guide rails 394 which engage two rollers 396 also mounted on the shaft 378.

Additional lift linkage assemblies geometrically identical with the lift linkage assembly 358, 364, 368 and 371 may be added at either or both ends of the mechanism to provide additional support points for the lift rails 356. The number of such assemblies to be added is dependent upon the overall length of the line. It can be seen that when link 372 is moved to the left, link 368 rotates counterclockwise about shaft 370; link 384 is driven counterclockwise about shaft 386 through an equal amount by link 390; and any additional lower toggle links are comparably driven through link 390. Therefore, all support points for the lift rails rise (and lower) together as controlled and driven by link 372.

This entire lift system assembly exclusive of the means for actuating link 372 is of nominally conventional design, but in a conventional design the lift linkage is driven by a separate prime mover from the prime mover which actuates the transfer rails.

The sequence pattern of the linkage may be visualized by reference to FIGS. 30, 31, 32 and 33, a set of sequential linkage schematics showing the positions of the linkage during four phases of the input and output motion. Only one set of lift linkages are shown, and the link 390 is omitted. It will be understood that all other lift linkages are slaved in unison with linkage shown. Both the horizontal support system for the transfer bars 326, and the vertical guide system for the lift rails 356, are omitted for clarity. It will be understood that the transfer bars 326 are guided to move only horizontally and that the lift bars 356 guided to move only vertically.

Figure 30:
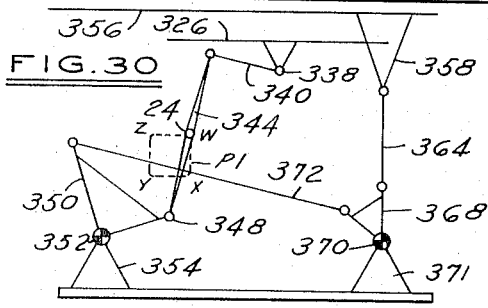

Referring to FIG. 30, the transfer bars 326 are in their returned position and the lift rails 356 are in their up position holding the workpieces in their work stations. This is the normal starting point of a transfer cycle. The output shaft 24 is at point W of its path P1.

Figure 31:
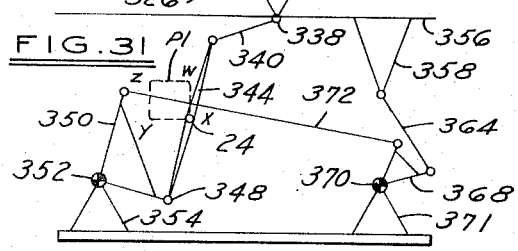

As the output shaft 24 traverses from point W to point X on its path P1, the lift rails 356 move downward through their vertical stroke while the transfer bars 326 remain substantially stationary, reaching the position shown in FIG. 31. During this movement, the link 344 moves downward, oscillating through a slight angular movement in the process. The link 350 is driven through a clockwise angular movement about shaft 352, while link 340 rotates counterclockwise about shaft 338. With the proper proportion between link 340 and 350, there is no substantial movement of shaft 338 or transfer bars 326 during this interval. The link 350 drives the link 372 to the right, causing the link 368 to rotate clockwise about shaft 370, lowering the lift rails 356 through link 364 and riser 358.

Figure 32:
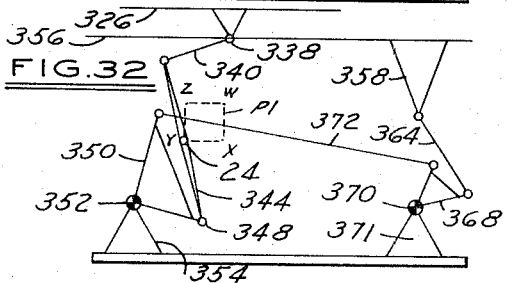

As the output shaft 24 traverses from point X to Y on its path P1, the transfer bars 326 move forward (to the left as viewed) through their horizontal stroke while the lift rails 356 remain substantially stationary in their lowered position reaching the condition shown in FIG. 32. During this movement, the link 344 rotates counterclockwise about shaft 348 and pulls the transfer bars 326 forward through links 340. During this interval the link 350 and the link 368 remain substantially stationary and the lift rails 356 remain in their lowered position.

Figure 33:
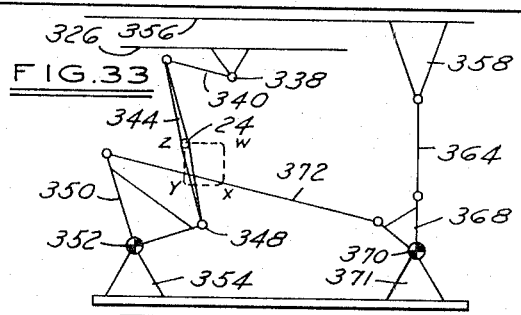

As the output shaft 24 traverses from point Y to Z on its path P1, the lift rails 356 move upward through their vertical stroke while the transfer bars 326 remain substantially stationary in their forward position, reaching the condition shown in FIG. 33. During this movement, the link 344 moves upward, again oscillating through a slight angular movement in the process. The link 350 is driven through a counterclockwise angular movement about shaft 352, while link 340 rotates clockwise about shaft 338. These effects will again substantially cancel and there is no movement of the transfer bars 326. The link 350 pulls the link 372 to the left causing the link 368 to rotate counterclockwise about shaft 370, raising the lift rails 356 through link 364 and riser 358.

As the output shaft 24 traverses from point Z to W on its path P1, the transfer bars 326 return through their horizontal stroke while the lift rails 356 remain substantially stationary in their raised position, again reaching the condition shown in FIG. 30, and completing the four-step transfer cycle. During this movement, the link 346 rotates clockwise about shaft 348 and drives the transfer bars 326 through their horizontal return stroke (to the right as viewed) through links 340. During this interval, the link 350 and the link 358 remain substantially stationary and the lift rails 356 remain in their raised position.

With this system, it is possible to change the magnitude of the horizontal stroke magnification by changing the position of the output shaft 24 on link 344. Similarly, it is possible to change the vertical stroke by changing the proportions of link 350 and/or link 368.

All four embodiments of the systems shown posses significant virtues compared to techniques in common usage today. The four-step transfer function is accomplished in one smooth uninterrupted sequence by a single mechanism, with all four steps automatically generated. Only one prime mover, such as an electric motor, is required. Other sequencing controls are not required. Furthermore, reversal may be accomplished by simply reversing the driving prime mover, i.e., the flow direction may be reversed by reversing the drive direction of the input shaft of the square drive. Additionally, short of component breakage, the mechanism cannot be gotten "out of sequence."

I claim:

1. In a transfer system in which a series of workpieces is transferred from one work station to another through a sequential motion pattern along a transfer path which consists of a first motion in which the workpiece is moved a distance in a direction substantially transverse to the transfer path, a second motion in which the workpiece is advanced in a direction parallel to the transfer path to the next station, a third motion in which the workpiece is lowered in a direction substantially opposite to the direction of the first motion, and a fourth motion in which the transfer system returns along the transfer path to its original starting position during which the workpieces are not returned, a mechanical driving means comprising:

a. a frame structure, b. a motion generating means on said frame structure having an output member movable around a substantially square path comprising four substantially equal isolated strokes, two primary strokes parallel to each other, and two secondary strokes parallel to each other and substantially perpendicular to said primary strokes, c. a transfer means operatively associated with said output member to be driven thereby to transfer workpieces from one work station to the next in a lift and carry and lower motion which comprises a transfer means extending along a transfer path, first means supporting said transfer means for motion transverse of the length of said transfer path and in the direction of the length of said path, and second means connecting said first supporting means with said output member to effect lifting and lowering of said bar means in two of the parallel strokes of the output path of said output member and advance and retraction of said bar means in the other two parallel strokes, and d. said first means supporting said bar means comprising a first link supported at one end by said second means on said output member, third means movably mounting the other end of said link, and fourth means connecting said link and said transfer bar means, said third means comprising a lever pivotally associated with said frame and to said link, and said fourth means comprising a pair of levers pivoted on said frame, one to contact said bar means in a raise and lower motion, and one associated with said bar means to shift it in the transfer path.

2. In a transfer system in which a series of workpieces is transferred from one work station to another through a sequential motion pattern along a transfer path which consists of a first motion in which the workpiece is moved a distance in a direction substantially transverse to the transfer path, a second motion in which the workpiece is advanced in a direction parallel to the transfer path to the next station, a third motion in which the workpiece is lowered in a direction substantially opposite to the direction of the first motion, and a fourth motion in which the transfer system returns along the transfer path to its original starting position during which the workpieces are not returned, a mechanical driving means comprising:

a. a frame structure, b. a motion generating means on said frame structure having an output member movable around a substantially square path comprising four substantially equal isolated strokes, two primary strokes parallel to each other, and two secondary strokes parallel to each other and substantially perpendicular to said primary strokes, c. a transfer means operatively associated with said output member to be driven thereby to transfer workpieces from one station to a next adjacent station in a lift, carry, and lower sequential motion which comprises:

1. transfer bar means extending along a transfer path,
2. first means mechanically associated with said bar means to lift and lower the bar relative to said transfer path upon actuation,
3. second means mechanically associated with said bar means to advance and retract the bar along the transfer path upon actuation, d. drive means comprising a first link connected at one portion to said output member wherein said portion will travel sequentially in said primary and secondary strokes, up, forward, down, and return, and e. means connecting said first link of said drive means simultaneously with said first and second means to effect said sequential isolated motion strokes of said transfer means.

3. A transfer system as defined in claim 2 in which said first means comprises an arm pivoted on said frame having means to contact and support said transfer bar means, said arm being movable in an arc to lift and lower said bar means, an actuator lever pivotally mounted on said frame at a first pivot point, a link connecting said lever to said arm at a second pivot point spaced from said first pivot point, a third pivot point on said lever between said first and second pivot points, and a second link connecting said third pivot point and said first link.

4. A transfer system as defined in claim 2 in which said second means comprises a second arm pivoted at one end on said frame and connected by a third link at the other end to said transfer bar means, and means connecting said first link to said second arm at a point intermediate the ends thereof.

5. A transfer system as defined in claim 2 in which:

a. said first means comprises an arm pivoted on said frame having means to contact and support said transfer bar means, said arm being movable in an arc to lift and lower said bar means, an actuator lever pivotally mounted on said frame at a first pivot point, a link connecting said lever to said arm at a second pivot point spaced from said first pivot point, a third pivot point on said lever between said first and second pivot points, and a second link connecting said third pivot point and said first link, and b. said second means comprises a second arm pivoted at one end on said frame and connected by a third link at the other end to said transfer bar means, and means connecting said first link to said second arm at a point intermediate the ends thereof.

6. A transfer means as defined in claim 2 in which said first and second means comprises a support plate disposed in spaced relation to and substantially parallel with said transfer bar means, and arm arm fixed to said transfer bar means extending in the direction of said support plate, said first link of said drive means having an end positioned to ride on said plate and connected intermediate its ends to said arm at a prescribed distance from said transfer means.

7. A transfer means as defined in claim 2 in which said first and second means comprises a combination bell crank pivoted to said transfer bar at a corner pivot, a lever arm pivoted intermediate its ends to said first link and pivoted at one end to one end of said crank adjacent said bar, a second link pivoted at one end to the other end of said lever arm and at the other end to a fixed support below said transfer bar, a third link pivoted at one end to a fixed support adjacent said transfer bar and pivoted at the other end to said first link, and a fourth link pivoted to said transfer bar at said corner pivot and pivoted to the other end of said first link.

8. A transfer means as defined in claim 2 in which said transfer means comprises a first of two parallel bars to move up and down transversely of its length and a second bar to move back and forth in the direction of its length, said first means comprises a plurality of toggle levers each pivotally fastened at one end to said first bar and at the other end to a fixed support, said toggle levers each being connected intermediate the ends to said first link through a bell crank lever, and said second means comprising an anchor pivot point on said second bar, a drag link pivoted at said anchor point, and means connecting said drag link and an end of said first link.

9. A transfer system as defined in claim 2 in which said motion generating means comprises:
  a. a frame member,
  b. a reaction member mounted on said frame member,
  c. a first rotating member mounted on said frame to rotate about a first axis,
  d. a second rotating member mounted on said first rotating member to rotate about a second axis displaced from said first axis,
  e. an output member mounted on said second rotating member to rotate about a third axis displaced from said second axis a distance of less than one-half the displacement distance of said second axis from said first axis while also revolving about said first and second axes,
  f. coupling means between said second rotating member and said reacting member whereby rotation of said first rotating member in said frame member about said first axis effects rotation of said second rotating member relative to said first rotating member causing said second rotating member to revolve about said first axis and said output member to revolve about said first and second axes, and
  g. driving means to impart rotation to one of said rotating members to effect rotation of said first rotating member around said first axis, said driving means comprising:
    1. a rotary input shaft mounted on said frame on said first axis,
    2. a first drive gear mounted on said input shaft, and
    3. second drive gear mounted on said second rotating member and in mesh with said first drive gear.

* * * * *